United States Patent
Lane

[15] 3,690,170
[45] Sept. 12, 1972

[54] AUTOMATIC WIND DIRECTION READOUT DEVICE

[72] Inventor: John H. Lane, Huntsville, Ala.

[73] Assignee: The United States of America as represented by the Secretary of the Army

[22] Filed: July 30, 1971

[21] Appl. No.: 167,739

[52] U.S. Cl. .............................. 73/188, 340/177 VA
[51] Int. Cl. ............................................ G01p 13/02
[58] Field of Search ................ 73/189, 188; 338/172; 340/177 VA, 209, 210

[56] References Cited
UNITED STATES PATENTS 2,770,129   11/1956   Dalzell ......................... 73/188
2,836,064   5/1958   York ......................... 73/188

Primary Examiner—Jerry W. Myracle
Attorney—Harry M. Saragovitz et al.

[57] ABSTRACT

A wind vane rotates the arm of a potentiometer having a three-terminal voltage divider. The filtered output voltage of the potentiometer is an indication of wind direction. Avoidance of any discontinuities in the output voltage due to the potentiometer gap is accomplished by a logic device and a relay which switches the voltage range of the potentiometer whenever the arm crosses the gap. Therefore, the filtered output of the potentiometer will be a continuously varying voltage extending over three full revolutions of the wind vane.

2 Claims, 2 Drawing Figures

AUTOMATIC WIND DIRECTION READOUT DEVICE

The present invention relates to weather observing instruments and more particularly to an automatic wind direction readout device.

Those concerned with the development of automatic wind direction recording devices have long recognized the need for a simple device which automatically records or reports the arithmetic average of wind direction as determined by the orientation of a wind vane and a potentiometer arm controlled thereby.

The basic prior art device produces an abrupt full scale jump in the potentiometer output each time the wind vane passes through the direction corresponding to the potentiometer end points. Obtaining the arithmetic mean of wind direction from a continuous recording of this device requires a lengthy analysis and calculation. An improved version uses two potentiometers plus an electronic switch but produces abrupt, full-scale jumps in the output when the vane shifts 180° beyond the potentiometer end points. Here again some sort of analysis is still required to obtain the average wind direction.

The general purpose of this invention is to provide an automatic wind direction measuring device which provides a continuous integratable output and wherein a single instantaneous sampling of the integrated output yields accurate information as to the average wind direction during the period of integration with no necessity for analysis or complex interpretation. Information may also be obtained by the same instantaneous sampling as to the amount and direction of wind shift during the period of integration.

The exact nature of this invention as well as other objects and advantages thereof will be readily apparent from consideration of the following specification relating to the annexed drawing in which.

Figure 1:
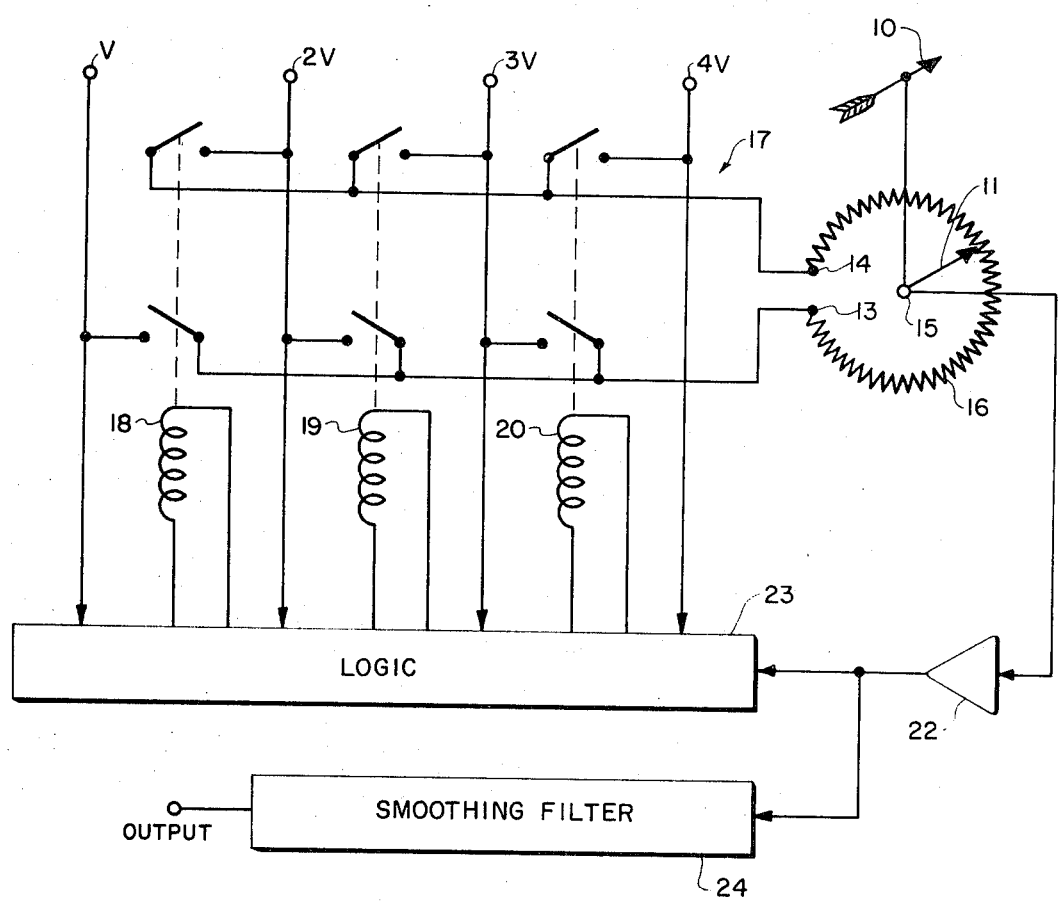
FIG. 1 is a schematic diagram of a preferred embodiment.
Figure 2:
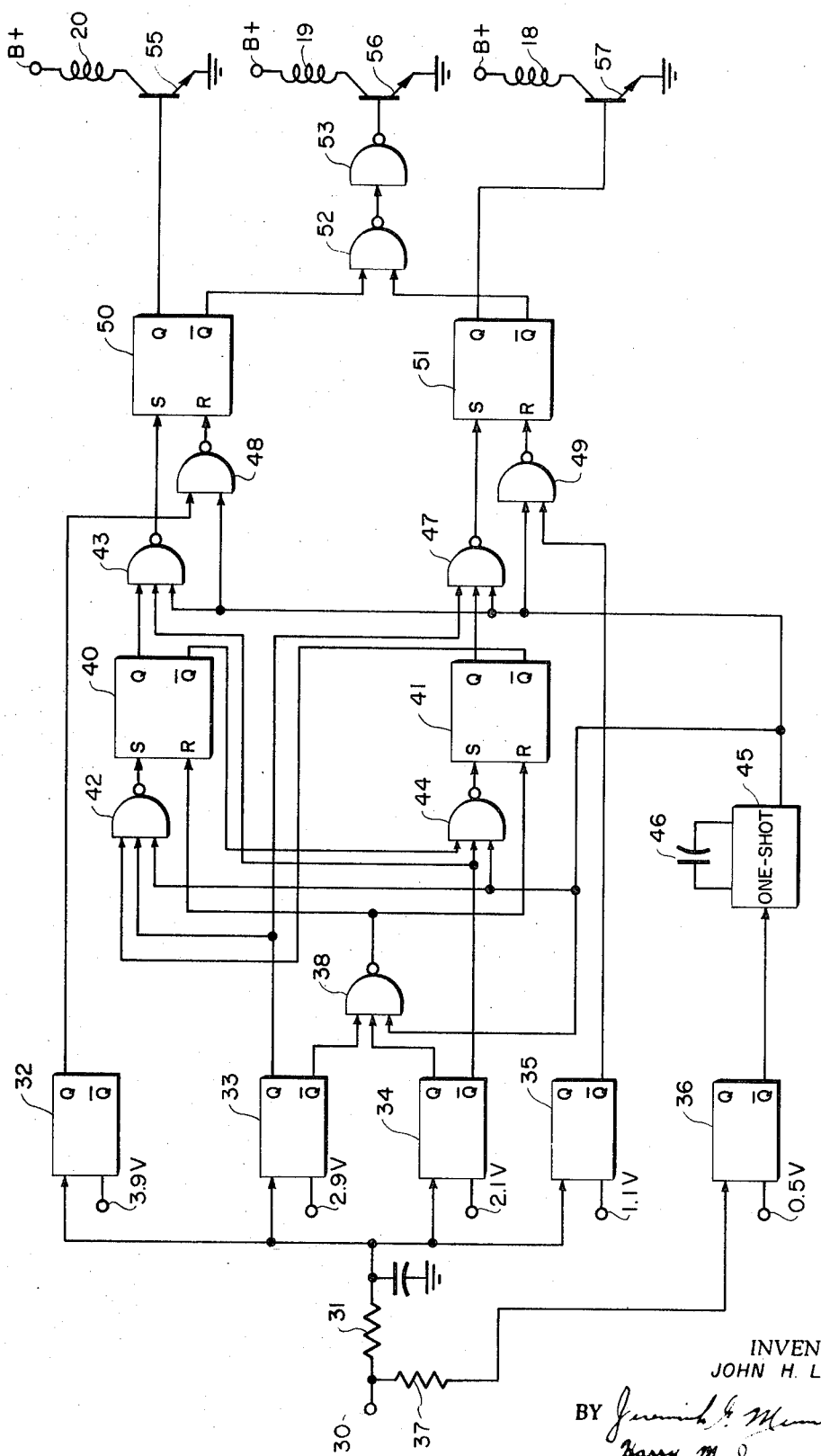
FIG. 2 is a diagram of the logic portion of the device shown in FIG. 1.

Referring now to the drawing, there is shown in FIG. 1 an automatic wind direction measuring device including a standard wind vane 10 ganged to the movable arm 11 of a potentiometer having three terminals 13, 14, and 15, and a voltage dividing resistor 16. The voltages V, 2V, 3V, and 4V are selectively applied to the potentiometer terminals 13 and 14 through a relay device 17 having three coils 18, 19, and 20.

The voltage at terminal 15, which depends on the orientation of arm 11 or vane 10, is applied to a unity gain amplifier 22, the output of which is connected to a logic device 23 and a smoothing filter 24.

Under normal operation the coil 19 is energized by the logic 23 and the terminals 13 and 14 assume the voltages 2V and 3V respectively. As the wind shifts, the movable arm 11 passes over resistor 16. The voltages on terminal 15 are smoothed by filter 24 and presented at the output terminal as a smoothly varying signal which is a continuous function of the instantaneous wind direction and which may be easily integrated or averaged.

When the arm 11 passes over the gap between terminals 13 and 14 and with coil 19 originally energized, the voltage of terminal 15 will abruptly change from 2V to 3V or vice versa depending on the direction of rotation of arm 11. Such a discontinuity in voltage, could not be readily averaged. With the aid of logic 23, this discontinuity in voltage is eliminated by operating one of the coils 18 or 20 to alter the voltage range of the potentiometer. Therefore, in total, the output of filter 25 will be a signal which varies smoothly between the voltage limits of V and 4V, which corresponds to a rotation of the wind vane 10 of 1,080° or three full revolutions. The effects of the potentiometer gap is therefore eliminated.

For example, assume that arm 11 moves directly from terminal 13 to terminal 14, thereby causing the voltage at terminal 15 to change abruptly from 2V to 3V volts. This abrupt change is detected by logic 23 which in turn deenergizes coil 19 and energizes coil 18. With coil 18 energized, the voltage of terminal 14 becomes 2V and the voltage of terminal 13 becomes V. Therefore, the voltage range of the resistor 16 has now been simply extended and the discontinuity eliminated. When the arm 11 passes back over the gap between terminals 14 and 13, the coil 18 is deenergized and the coil 19 is again energized. This operation will be made clearer in connection with the detailed description of logic 23, which will now be given.

The output of amplifier 22 (FIG. 1) is connected to the logic 23 via an input terminal 30 which in turn feeds a set of Schmitt trigger circuits 32–35 via an RC delay 31, and a Schmitt trigger 36 via resistor 37. Each of the Schmitt trigger circuits is triggered when the input voltages exceed the reference voltages designated at the reference input terminals. For example, when the input voltage to circuit 33 exceeds 2.9V volts the circuit 33 is triggered and the Q output thereof goes positive and the Q̄ output goes to ground. When the input voltage to circuit 33 is less than 2.9V volts, the circuit returns to the untriggered state with the Q̄ output positive and the Q output at ground.

The circuit 36 is used to trigger a one-shot 45 at the instant of a positive going Q̄ output transition. The output of one-shot goes to ground when the input goes positive and when the input goes to ground, the output returns to the positive state after a fixed delay determined by capacitor 46. The output of one-shot 45 is used to prevent a negative going output transition of NAND-gates 38, 42, 43, 44, 47, 48 and 49 when the voltage of terminal 30 goes below 0.5V volts. When the voltage at terminal 30 is above 0.5V volts, the outputs of circuits 32, 33, 34 and 35 are used to establish the states of set-reset flip-flops 40, 41, 50 and 51 via NAND-gates set-reset 42, 43, 44, 47, 48, and 49. The flip-flops 40, 41, 50 and 51 are set and reset by a negative going input transition to the S and R inputs respectively. A set flip-flop has the Q output positive and a reset flip-flop has the Q̄ output positive.

Initially, flip-flops 40, 41, 50 and 51 are all in the reset state. This may be accomplished by a reset button or other means (not shown) which forces the initial condition. This causes energization of coil 19 (this will become evident later) which in turn applies the voltages 2V and 3V to the terminals 13 and 14 respectively. Therefore, the terminals 15 and 30 will be generally somewhere between 2V and 3V volts or more accurately 2.1V and 2.9V volts depending on the orientation of vane 10. Under these conditions, circuits 34, 35, and 36 are triggered, circuits 32 and 33 are untriggered, and flip-flops 40, 41, 50, and 51 are stabilized in the reset state. The last condition is true because the NAND-gates 42, 43, 44 and 47 each have at least one negative input, thereby preventing the setting of the flip-flops 40, 41, 50 and 51. For example: the $\bar{Q}$ output of circuit 34 is negative preventing the output of NAND gate 44 from going negative and setting flip-flop 41; the $\bar{Q}$ output of circuit 33 is negative preventing the outputs of NAND-gates 42 and 47 from going negative and setting flip-flops 40 and 51; the $\bar{Q}$ output of flip-flop 40 is negative preventing the output of NAND-gate 43 from going negative and setting flip-flop 50. Since the $\bar{Q}$ output from flip-flops 50 and 51 are both positive at this time, the output of inverter 53 is positive, thereby turning on transistor 56 which energizes coil 19. The ground potential of the Q outputs of flip-flops 50 and 51 turns off transistors 55 and 57 respectively, thereby deenergizing coils 20 and 18.

Operation of the logic 23, as the vane 10 makes a counterclockwise rotation such that arm 11 moves quickly across the potentiometer gap from terminal 14 to terminal 13 (it is assumed that coil 19 is in the energized state) will now be given. As the arm 11 approaches terminal 14, the input voltage to logic 23 first exceeds 2.9V volts, thereby triggering circuit 33. With the Q output of circuit 33 going positive, the output of NAND-gate 42 goes negative, thereby setting flip-flop 40. No other changes in the state of the flip-flops 40, 41, 50 and 51 takes place at this time.

When the arm 11 reaches terminal 13, the input voltage to logic 23 drops to 2V volts which causes circuits 33 and 34 to return to the untriggered state. As a result the $\bar{Q}$ output of circuit 34 goes positive and the NAND-gate 43 makes a negative output transition which sets flip-flop 50. Setting flip-flop 50 turns transistor 55 on, energizes coil 20, and deenergizes coil 19 via NAND-gate 52. As pointed out above, energization of coil 20 causes the potential of terminal 14 to become 4V volts and the voltage of terminal 13 to become 3V volts.

If the vane 10 should make a second counterclockwise turn, thereby causing the arm 11 to cross the potentiometer gap again from terminal 14 to terminal 13, the circuit 32 will be triggered when arm 11 contacts terminal 14 causing the Q output thereof to go positive. At this time, both inputs to NAND-gate 48 are positive resulting in a negative output transition which resets flip-flop 50, thereby deenergizing coil 20 and energizing coil 19. With coil 19 energized, the logic 23 returns to the normal or initial state, i.e., flip-flops 40, 41, 50 and 51 are all reset.

If, however, the arm 11 should not cross the potentiometer gap a second time in the counterclockwise direction, but should back up across the gap in the clockwise direction after the coil 20 was energized, i.e., the arm 11 moves directly from terminals 13 to 14, then the coil 19 must again be energized. Here again the state of logic 23 does not change until arm 11 contacts terminal 14 which causes circuit 32 to be triggered. Logic 23 then returns to the normal or initial state (flip-flops 40, 41, 50, and 51 are all reset and coil 19 is energized) for the same reasons just stated above.

To summarize, assuming the logic 23 is in the initial state with coil 19 energized, a counterclockwise rotation of arm 11 across the potentiometer gap will be detected by logic 23 which will energize coil 20, thereby changing the voltages at terminals 13 and 14 to eliminate the voltage discontinuity created by the potentiometer gap. It is pointed out again that the short time discontinuities in voltages present at terminal 15 during the gap crossing and subsequent switching are removed by filter 24. The returning of arm 11 across the potentiometer gap is also detected by logic 23 and coil 19 is again energized. Also, if the arm 11 should make two counterclockwise crossings of the potentiometer gap, the logic 23 is reset to the initial state with coil 19 energized. Here there will be a long term discontinuity in the output voltage which could simply be eliminated by providing additional relay stages, voltages, and corresponding logic to detect the second crossing.

A similar sequence of steps takes place during clockwise rotations of arm 11 across the potentiometer gap. For example, as arm 11 approaches terminal 13 from the initial state, the voltage at terminal 15 falls below 2.1V volts causing circuit 34 to enter the untriggered state with the $\bar{Q}$ output going positive. This action causes the output of NAND-gate 44 to make a negative going transition, thereby setting flip-flop 41 and causing the Q output thereof to go positive. When arm 11 contacts terminal 14, the potential of terminal 15 rises to 3V volts triggering circuit 33 and causing the output of NAND-gate 47 to make a negative going transition, thereby setting flip-flop 51. With flip-flop 51 set, coil 19 becomes deenergized and coil 18 is energized. At this point the voltages at terminals 13 and 14 are changed so as to extend the voltage range of the potentiometer. Also similar to the previously explained case, if the arm 11 should cross the potentiometer gap again in either direction, the circuit 35 is untriggered, NAND gate 49 makes a negative going output transition, flip-flop 51 is reset, coil 18 is deenergized, coil 19 is energized, and the logic 23 returns to the initial or normal state with flip-flops 40, 41, 50, and 51 all reset.

Finally, if the arm 11 should enter but not cross the potentiometer gap, there will be a drop in voltage at terminal 15 below 0.5V volts which will immediately untrigger circuit 36 causing the output of one-shot 45 to go negative, thereby blocking NAND-gates 38, 42, 43, 44, 47, 48, and 49 and preventing any change in the present state of the flip-flops 40, 41, 50, and 51. It is pointed out that with a loss of voltage at terminal 30 the circuit 36 will be untriggered before any of the other circuits 32– 35 are changed since there is a time delay introduced via RC delay 31 to the latter circuits. When the arm 11 leaves the potentiometer gap and a voltage is restored to terminal 30, the output of one-shot 45 remains negative for a predetermined time so that the original states of the circuits 32–36 may be recovered before the NAND-gates 38, 42, 43, 44, 47, 48, and 49 are again no longer blocked.

There may be other times where there is a loss of voltage at terminal 15 other than when the arm 11 is in the potentiometer gap. For example, there may be a piece of dirt under the contact on the arm 11 or the device may be subjected to a shock which causes the arm 11 to momentarily leave the contacts. Also, the relay 17 may be a slow operating device which will cause a relatively long time loss of voltage when switching. In all such cases, the utility of the circuit 36 becomes evident for preventing malfunctions. In most cases the filter 24 will remove the voltage discontinuities caused by short term losses in voltage. However, in those rare cases where the loss of voltage is for a prolonged period, such as the arm 11 remains in the potentiometer gap, the discontinuity in output voltage may be easily corrected by providing a sample-and-hold circuit at the filter output which is energized by the output of circuit 36.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A device for providing an electrical signal which is a continuous function of the direction of alignment of a wind vane comprising: a potentiometer means having first, second and third terminals and a resistor means connected in parallel across the gap formed by said first and second terminals; said potentiometer means further including a movable arm means having a contact means mounted on said arm and connected to said third terminal; driving means connected between said arm and said wind vane for sliding said contact means along said resistor means and across said gap in response to movements of said wind vane; a source of a plurality of adjacent potential ranges; a switching means; a detection means; and output means; said switching means connected between said source and said first and second terminals for selectively connecting across said first and second terminals different ones of said potential ranges in response to switching signals from said detection means; said detection means connected to said third terminal for detecting movements of said contact means across said gap and for providing switching signals to said switching means; said output means connected to said third terminal and including filter means for removing short time discontinuities.

2. The device according to claim 1 and wherein said resistor means is a single turn resistor.

* * * * *